United States Patent [19]
Washington et al.

[11] Patent Number: 5,300,370
[45] Date of Patent: Apr. 5, 1994

[54] LAMINATED FLUID FLOW FIELD ASSEMBLY FOR ELECTROCHEMICAL FUEL CELLS

[75] Inventors: Kirk B. Washington, Richmond; David P. Wilkinson, North Vancouver; Henry H. Voss, West Vancouver, all of Canada

[73] Assignee: Ballard Power Systems Inc., North Vancouver, Canada

[21] Appl. No.: 24,660

[22] Filed: Mar. 1, 1993

Related U.S. Application Data

[63] Continuation-in-part of Ser. No. 975,791, Nov. 13, 1992.

[51] Int. Cl.$^5$ .............................................. H01M 8/04
[52] U.S. Cl. ........................................ 429/34; 429/38; 429/39
[58] Field of Search .................... 429/34, 38, 39, 32

[56] References Cited

U.S. PATENT DOCUMENTS 4,988,583  1/1991  Watkins et al. .
5,108,849  4/1992  Watkins et al. .
5,230,966  7/1993  Voss et al. ........................ 429/26

OTHER PUBLICATIONS

Interim Report: "New Membrane-Catalyst For Solid Polymer Electrolyte Systems", P.O. No. 9-X53-D62-72-1, Prepared for University of California, Los Alamos National Laboratory, *General Electrical Company*, 1984.

Product Description: "GRAFOIL Flexible Graphite Quick Reference Grade Guide", *UCAR Carbon Company, Inc.*, 1991.

*Primary Examiner*—Prince Willis, Jr.
*Assistant Examiner*—M. Nuzzolillo
*Attorney, Agent, or Firm*—McAndrews, Held & Malloy, Ltd.

[57] ABSTRACT

A laminated fluid flow field assembly for an electrochemical fuel cell comprises a separator layer and a stencil layer. The separator layer is formed of electrically conductive, substantially fluid impermeable sheet material. The stencil layer is formed of electrically conductive sheet material, and has a fluid inlet and at least one opening extending between its major surfaces and in fluid communication with the fluid inlet. The separator layer and the stencil layer are consolidated along one of their major surfaces. In operation, the separator layer and the stencil layer cooperate to form an open-faced channel for conducting pressurized fluid introduced at the fluid inlet.

17 Claims, 8 Drawing Sheets

LAMINATED FLUID FLOW FIELD ASSEMBLY FOR ELECTROCHEMICAL FUEL CELLS

CROSS-REFERENCE TO RELATED APPLICATION

This application is a continuation-in-part of U.S. patent application Ser. No. 07/975,791 filed Nov. 13, 1992, entitled "Fuel Cell Fluid Flow Field With Discontinuous Fluid Flow Channels." The related application describes fluid flow field plates for electrochemical fuel cells incorporating discontinuous fluid flow channels.

FIELD OF THE INVENTION

The present invention relates to electrochemical fuel cells. More particularly, the present invention relates to fluid flow field plates having a laminated structure for use in electrochemical fuel cells, as well as the method of manufacturing such laminated fluid flow field assemblies.

BACKGROUND OF THE INVENTION

Electrochemical fuel cells convert fuel and oxidant to electricity and reaction product. In electrochemical fuel cells employing hydrogen as the fuel and oxygen as the oxidant, the reaction product is water. Such fuel cells generally employ a membrane electrode assembly ("MEA") consisting of a solid polymer electrolyte or ion exchange membrane disposed between two electrodes formed of porous, electrically conductive sheet material, typically carbon fiber paper. The MEA contains a layer of catalyst, typically in the form of finely comminuted platinum, at each membrane/electrode interface to induce the desired electrochemical reaction. The electrodes are electrically coupled to provide a path for conducting electrons between the electrodes through an external load.

At the anode, the fuel permeates the porous electrode material and reacts at the catalyst layer to form cations, which migrate through the membrane to the cathode. At the cathode, the oxygen-containing gas supply reacts at the catalyst layer to form anions. The anions formed at the cathode react with the cations to complete the electrochemical reaction and form a reaction product.

In electrochemical fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of hydrogen ions from the anode to the cathode. In addition to conducting hydrogen ions, the membrane isolates the hydrogen-containing fuel stream from the oxygen-containing oxidant stream. At the cathode, oxygen reacts at the catalyst layer to form anions. The anions formed at the cathode react with the hydrogen ions that have crossed the membrane to complete the electrochemical reaction and form liquid water as the reaction product.

In conventional fuel cells, the MEA is interposed between two fluid-impermeable, electrically conductive plates, commonly referred to as the anode and the cathode plates, respectively. The plates serve as current collectors, provide structural support for the porous, electrically conductive electrodes, provide means for carrying the fuel and oxidant to the anode and cathode, respectively, and provide means for removing water formed during operation of the fuel cell. When the channels are formed in the anode and cathode plates, the plates are referred to as fluid flow field plates. When the anode and cathode plates overlay channels formed in the anode and cathode porous material, the plates are referred to as separator plates.

Reactant feed manifolds are generally formed in the anode and cathode plates, as well as in the MEA, to direct the fuel (typically substantially pure hydrogen or hydrogen-containing reformate from the conversion of hydrocarbons such as methanol or natural gas) to the anode and the oxidant (typically substantially pure oxygen or oxygen-containing gas) to the cathode via the channels formed in either the fluid flow field plates or the electrodes themselves. Exhaust manifolds are also generally formed in the anode and cathode plates, as well as the MEA, to direct unreacted fuel and oxidant, as well as water accumulated at the cathode, from the fuel cell.

Multiple fuel cell assemblies comprising two or more anode plate/MEA/cathode plate combinations, referred to as a fuel cell stack, can be connected together in series (or in parallel) to increase the overall power output as required. In such stack arrangements, the cells are most often connected in series, wherein one side of a given fluid flow field or separator plate is the anode plate for one cell, the other side of the plate is the cathode plate for the adjacent cell, and so on.

Perfluorosulfonic ion exchange membranes, such as those sold by DuPont under its Nafion trade designation, have been used effectively in electrochemical fuel cells. Fuel cells employing Nafion-type cation exchange membranes require accumulated water to be removed from the cathode (oxidant) side, both as a result of the water transported across the membrane with cations and product water formed at the cathode from the electrochemical reaction of hydrogen cations with oxygen. A new type of experimental perfluorosulfonic ion exchange membrane, sold by Dow under the trade designation XUS 13204.10, appears to have significantly less water transported with hydrogen cations across the membrane. Fuel cells employing the Dow experimental membrane thus tend to accumulate less on the cathode (oxidant) side, as the accumulated water at the cathode is essentially limited to product water formed from the electrochemical reaction of hydrogen and oxygen.

A typical prior art fluid flow field plate, exemplified by General Electric Company and Hamilton Standard in a 1984 report for the U.S. Department of Energy (LANL No. 9-X53-D6272-1), included a plurality of parallel open-faced fluid flow channels formed in a major surface of a rigid, electrically conductive plate. The parallel channels extended between an inlet header and an outlet header formed in the plate. The parallel channels were typically rectangular in cross-section, and about 0.03 inches deep and about 0.03 inches wide. The inlet header was connected to an opening in the plate through which a pressurized reactant (fuel or oxidant) stream is supplied. The outlet header was connected to an opening in the plate through which the exhaust stream is discharged from the cell. In operation, the reactant stream ran from the inlet to the inlet header and then to the parallel channels from which reactant from the stream diffused through the porous electrode material to the electrocatalytically active region of the MEA. The stream then flowed to the outlet header and then to the outlet from which it was exhausted from the fuel cell.

Watkins U.S. Pat. Nos. 4,988,583 and 5,108,849 issued Jan. 29, 1991 and Apr. 28, 1992, respectively, describe fluid flow field plates which include a fluid supply opening and a fluid exhaust opening formed in the plate surface. Continuous open-faced fluid flow channels formed in the surface of the plate traverse the central area of the plate surface in a plurality of passes, that is, in a serpentine manner. Each channel has a fluid inlet at one end and a fluid outlet at the other end. The fluid inlet and outlet of each channel are directly connected to the fluid supply opening and fluid exhaust opening, respectively. The continuous channel design promotes the forced movement of water through each channel before the water can coalesce, thereby promoting uniform reactant flow across the surface of the cathode.

U.S. patent application Ser. No. 07/975,791 filed Nov. 13, 1992, incorporated by reference herein in its entirety, describes and claims a fluid flow field plate for electrochemical fuel cells in which the inlet and outlet flow channels are discontinuous. The employment of discontinuous flow channels, as described in U.S. patent application Ser. No. 07/975,791, has several advantages:

1. Improved performance, particularly at higher reactant inlet pressures, resulting from (a) the increased partial pressure of reactant gases at the active front (less reactant depletion in the stream compared to the continuous, serpentine channels in which the reactant is continuously depleted as the stream flows away from the inlet), (b) more effective water removal due to better access of the reactant stream to the electrocatalytically active region at the membrane/electrode interface, (c) more uniform current density due to more even distribution of the reactant stream across the electrocatalytically active area of the fuel cell and the avoidance of water pooling in the flow channels, and (d) lower flow field plate/electrode contact resistance due to the use of a decreased amount of the flow field plate surface to accommodate the flow channels.

2. Improved fuel cell lifetime resulting from (a) the ability to reduce the compressive load on the electrodes due to decreased contact resistance between the flow field plates and the electrodes, and (b) more uniform reactant gas relative humidity due to the reduced depletion of reactant in the stream compared to the continuous, serpentine flow channel design.

3. Reduced manufacturing costs resulting from (a) the ability to reduce the amount of graphite plate milling required for continuous channels and to relax the tolerances required for the channel dimensions, (b) a wider range of materials and fabrication techniques permitted with the discontinuous flow channel design, such as stamping of flow field stencils, to be employed, particularly the use of thinner electrically conductive sheet materials, as the discontinuous channels do not require the thickness and rigidity of the electrically conductive plates in which continuous, serpentine flow channels are formed, and (3) the ability to employ a stenciled graphite foil laminate, thereby reducing the weight (and cost) associated with rigid graphite flow field plates.

Conventional methods of fabricating fluid flow field plates require the engraving or milling of flow channels into the surface of the rigid graphite plates. The resin-impregnated graphite plates tend to have a high impurity content, relatively poor fracture resistance, and significant fluid (especially gas) permeability, particularly in the case of thinner rigid graphite plates, and most particularly in the case of plates less than 0.125 inches thick. Conventional fluid flow field plates are also expensive, both in raw material costs and in machining costs. The machining of channels and the like into the graphite plate surfaces causes significant tool wear and requires significant processing times.

Accordingly, it is an object of the invention to provide an improved, laminated fluid flow field assembly for use in electrochemical fuel cells that is reduced in weight and volume, and that is simpler and less expensive to manufacture than conventional fluid flow field plates Another object of the invention is to provide an improved electrochemical fuel cell that includes a laminated fluid flow field plate having improved weight, volume and manufacturability characteristics.

A further object of the invention is to provide an improved method of fabricating a laminated fluid flow field plate for use in electrochemical fuel cells.

SUMMARY OF THE INVENTION

The above and other objects are achieved by a laminated fluid flow field assembly for an electrochemical fuel cell. The assembly comprises:

- a separator layer formed of electrically conductive, substantially fluid impermeable sheet material, the separator layer having two oppositely facing major surfaces;
- a stencil layer formed of electrically conductive sheet material, the stencil layer having two oppositely facing major surfaces, the stencil layer having a fluid inlet formed therein and at least one opening formed therein extending between the major surfaces thereof, the at least one opening in fluid communication with the fluid inlet; and
- means for consolidating the separator layer and the stencil layer along one of their respective major surfaces.

In operation, the separator layer and the stencil layer cooperate to form at least one open-faced channel for conducting pressurized fluid introduced at the fluid inlet.

In the preferred laminated fluid flow field assembly, the stencil layer has a fluid outlet formed therein and the at least one opening comprises at least one inlet opening extending from the fluid inlet and at least one outlet opening extending from the fluid outlet. The at least one inlet opening is preferably discontinuous with respect to the at least one outlet opening, whereby the separator layer and the stencil layer cooperate to form at least two open-faced channels for conducting pressurized fluid introduced at the fluid inlet to the fluid outlet.

In one preferred embodiment of the laminated fluid flow field assembly, the at least one inlet opening comprises an inlet header opening extending from the fluid inlet and a plurality of inlet branch openings extending from the inlet header opening, and the at least one outlet opening comprises an outlet header opening extending from the fluid outlet and a plurality of outlet branch openings extending from the outlet header opening.

In another preferred embodiment of the laminated fluid flow field assembly, the at least one outlet opening comprises a plurality of separate outlet openings. Each pair of adjacent outlet channels has an inlet opening disposed therebetween along a substantial portion thereof. The at least one outlet opening preferably comprises at least three separate outlet openings and each inlet opening disposed between each pair of adjacent outlet openings is separate with respect to the remainder of the inlet openings.

In another embodiment of the laminated fluid flow field assembly, the stencil layer has a fluid outlet formed therein and the at least one opening extends continuously between the fluid inlet and the fluid outlet, whereby the separator layer and the stencil layer cooperate to form at least one open-faced channel for conducting pressurized fluid introduced at the fluid inlet to the fluid outlet.

In still another preferred embodiment of the laminated fluid flow field assembly, the stencil layer is a first stencil layer and the assembly further comprises:

a second stencil layer formed of electrically conductive sheet material, the second stencil layer having two oppositely facing major surfaces, the second stencil layer having a fluid inlet formed therein and having at least one opening formed therein extending between the major surfaces thereof, the at least one opening in fluid communication with the inlet; and means for consolidating the separator layer and the second stencil layer along the major surface of the separator layer facing away from the first stencil layer.

In operation, the separator layer and the second stencil layer cooperate to form at least one open-faced channel for conducting pressurized fluid introduced at the fluid inlet of the second stencil layer.

The separator layer can be formed from a consolidated plurality of individual layers of electrically conductive sheet material, at least one layer of which is substantially fluid impermeable. The stencil layer can also be formed from a consolidated plurality of individual layers of electrically conductive sheet material. At least one of the separator layer and the stencil layer is preferably formed from graphite foil. Most preferably, both the separator layer and the stencil layer are formed from graphite foil.

The above and other objects are also achieved by an electrochemical fuel cell for converting a fluid fuel stream and a fluid oxidant stream to a reaction product stream and electrical energy, in which the fuel cell comprises:

first and second laminated fluid flow field assemblies, each of the assemblies comprising:

a separator layer formed of electrically conductive, substantially fluid impermeable sheet material, the separator layer having two oppositely facing major surfaces;

a stencil layer formed of electrically conductive sheet material, the stencil layer having two oppositely facing major surfaces, the stencil layer having a fluid inlet formed therein and having at least one opening formed therein extending between the major surfaces thereof, the at least one opening in fluid communication with the inlet;

means for consolidating the separator layer and the stencil layer along one of their respective major surfaces;

whereby the separator layer and the stencil layer cooperate to form at least one open-faced channel for conducting pressurized fluid introduced at the inlet;

a membrane electrode assembly interposed between the first and second laminated fluid flow field assemblies, the membrane electrode assembly comprising:

an anode having a catalyst associated therewith to render a region of the anode electrocatalytically active wherein cations are produced from the fluid fuel stream;

a cathode having a catalyst associated therewith to render a region of the cathode electrocatalytically active wherein an electrochemical reaction between the cations and the fluid oxidant stream is promoted;

a solid polymer ion exchange membrane disposed between the anode assembly and the cathode assembly, the membrane facilitating the migration of cations from the anode assembly to the cathode assembly and isolating the fluid fuel stream from the fluid oxidant stream;

an electrical path for conducting electrons formed at the anode assembly to the cathode assembly.

In another embodiment of the electrochemical fuel cell, each of the stencil layers is a first stencil layer, and at least one of the first and second laminated fluid flow field assemblies further comprises:

a second stencil layer formed of electrically conductive sheet material, the second stencil layer having two oppositely facing major surfaces, the second stencil layer having a fluid inlet formed therein and having at least one opening formed therein extending between the major surfaces thereof, the at least one opening in fluid communication with the inlet;

means for consolidating the separator layer and the second stencil layer along the major surface of the separator layer facing away from the first stencil layer;

whereby the separator layer and the second stencil layer cooperate to form at least one open-faced channel for conducting pressurized fluid introduced at the fluid inlet of the second stencil layer to the electrode of an adjacent membrane electrode assembly.

In still another embodiment of the electrochemical fuel cell, the fuel cell further comprises a cooling assembly adjacent one of the separator layers on the side facing away from the membrane. The cooling assembly comprises:

a coolant separator layer formed of electrically conductive, substantially coolant impermeable sheet material, the coolant separator layer having two oppositely facing major surfaces;

a coolant stencil layer interposed between the adjacent separator and the coolant separator layer, the coolant stencil layer formed of electrically conductive sheet material having two oppositely facing major surfaces, the coolant stencil layer having a coolant inlet and a coolant outlet formed therein and having at least one opening formed therein extending between the major surfaces thereof, the at least one opening in fluid communication with the coolant inlet and the coolant outlet;

means for consolidating the coolant separator layer and the coolant stencil layer along one of their respective major surfaces;

whereby the coolant separator layer and the coolant stencil layer cooperate to form at least one open-faced channel for conducting pressurized coolant fluid between the coolant inlet and the coolant outlet.

The major surface of the coolant separator layer facing away from the coolant stencil layer can cooperate with another stencil layer to form a laminated fluid flow field assembly of an adjacent fuel cell.

The above and other objects are further achieved by a method of fabricating a laminated fluid flow field assembly for an electrochemical fuel cell. The method comprises the steps of:

providing a separator layer formed of electrically conductive, substantially fluid impermeable sheet material, the separator layer having two oppositely facing major surfaces;

providing a stencil layer formed of electrically conductive sheet material, the stencil layer having two oppositely facing major surfaces, forming a fluid inlet in the stencil layer;

forming at least one opening extending between the major surfaces of the stencil layer, the at least one opening in fluid communication with the inlet;

consolidating the separator layer and the stencil layer along one of their respective major surfaces.

In the preferred fabrication method, the stencil layer is a first stencil layer, and the fabrication method further comprises the steps of:

providing a second stencil layer formed of electrically conductive sheet material, the second stencil layer having two oppositely facing major surfaces;

forming a fluid inlet in the second stencil layer;

forming at least one opening extending between the major surfaces of the second stencil layer, the at least one opening in fluid communication with the inlet;

consolidating the separator layer and the second stencil layer along the surface of the separator layer facing away from the first stencil layer.

DETAILED DESCRIPTION OF THE PREFERRED EMBODIMENTS

Figure 1:
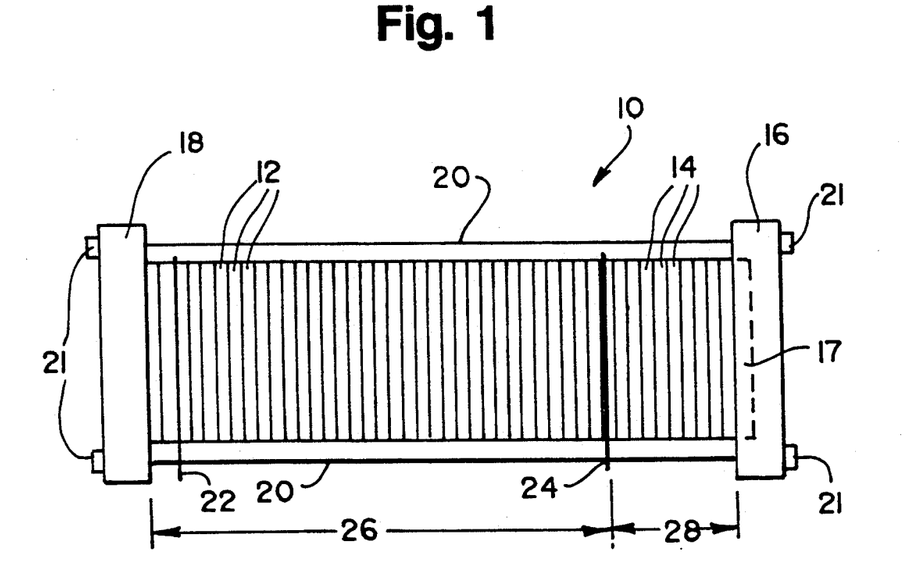
FIG. 1 is a side elevation view of a fuel cell stack showing the electrochemically active and humidification sections.

Turning first to FIG. 1, a fuel cell stack assembly 10 includes an electrochemically active section 26 and optionally includes a humidification section 28. Stack assembly 10 is a modular plate and frame design, and includes a compression end plate 16 and a fluid end plate 18. An optional pneumatic piston 17, positioned within compression end plate 16, applies uniform pressure to the assembly to promote sealing. Bus plates 22 and 24 located on opposite ends of active section 26 provide the negative and positive contacts, respectively, for the electrical path conducting current generated by the assembly to an external electrical load (not shown). Tie rods 20 extend between end plates 16 and 18 to retain and secure stack assembly 10 in its assembled and consolidated state with fastening nuts 21.

Active section 26 includes, in addition to bus plates 22 and 24, a plurality of fuel cell repeating units 12. Each repeating unit 12 consists of a membrane electrode assembly, an anode fluid flow field plate, a cathode fluid flow field plate (or alternatively anode and cathode separator layers if the anode and cathode reactant flow channels are formed in the surfaces of the electrode material) and optionally a cooling jacket, as described in more detail below. In the assembly illustrated in FIG. 1, the repeating units 12 are electrically coupled in series by virtue of the contact between the electrically conductive layers which form the flow field plates (or the separator layers) and the cooling jackets.

Optional humidification section 28 includes a plurality of humidification assemblies 14, each assembly 14 consisting of fuel or oxidant reactant flow field plate, a water flow field plate, and a water transport membrane interposed between the reactant flow field plate and the water flow field plate. When present, humidification section 28 imparts water to the fuel and oxidant streams fed to active section 26, thereby preventing the membranes within the active section from drying out.

Figure 2:
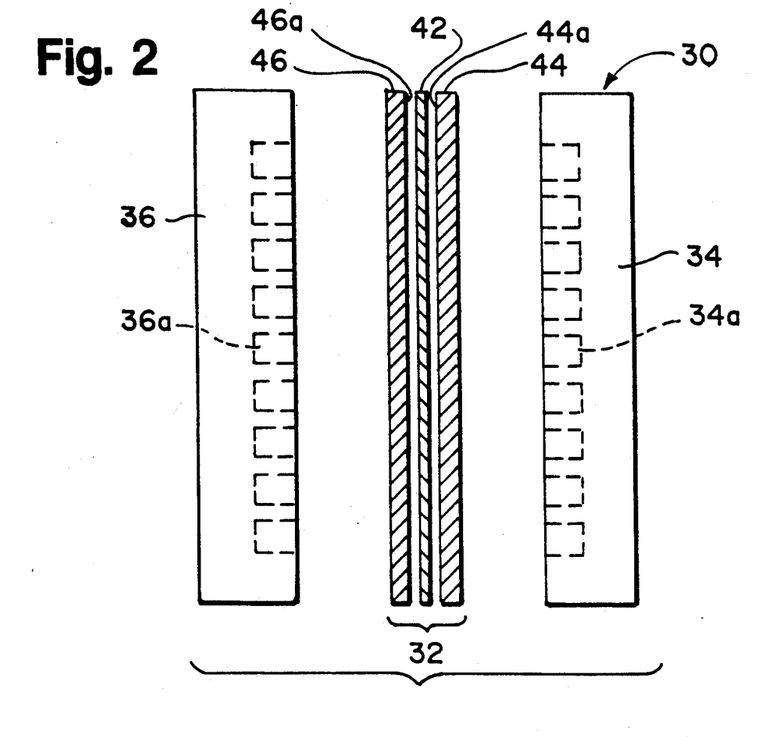
FIG. 2 is an exploded side view of a fuel cell including a membrane electrode assembly interposed between two conventional fluid flow field plates having reactant flow channels formed in the surfaces facing the electrodes.

FIG. 2 illustrates a conventional fuel cell 30, which includes a membrane electrode assembly 32 interposed between rigid flow field plates 34 and 36. Membrane electrode assembly 32 consists of an ion exchange membrane 42 interposed between two electrodes, namely, anode 44 and cathode 46. Anode 44 and cathode 46 are typically formed of porous electrically conductive sheet material, preferably carbon fiber paper, and have planar major surfaces 44a and 46a, respectively. Electrodes 44 and 46 have a thin layer of catalyst material disposed on their major surfaces 44a and 46a, respectively, at the interface with membrane 42 to render them electrochemically active.

As shown in FIG. 2, anode flow field plate 34 has at least one open faced channel 34a engraved, milled or molded in its surface facing membrane 42. Similarly, cathode flow field plate 36 has at least one open faced channel 36a engraved, milled or molded in its major surface facing membrane 42. When assembled against the cooperating major surfaces of electrodes 44 and 46, channels 34a and 36a form the reactant flow field passages for the fuel and oxidant, respectively.

Figure 3:
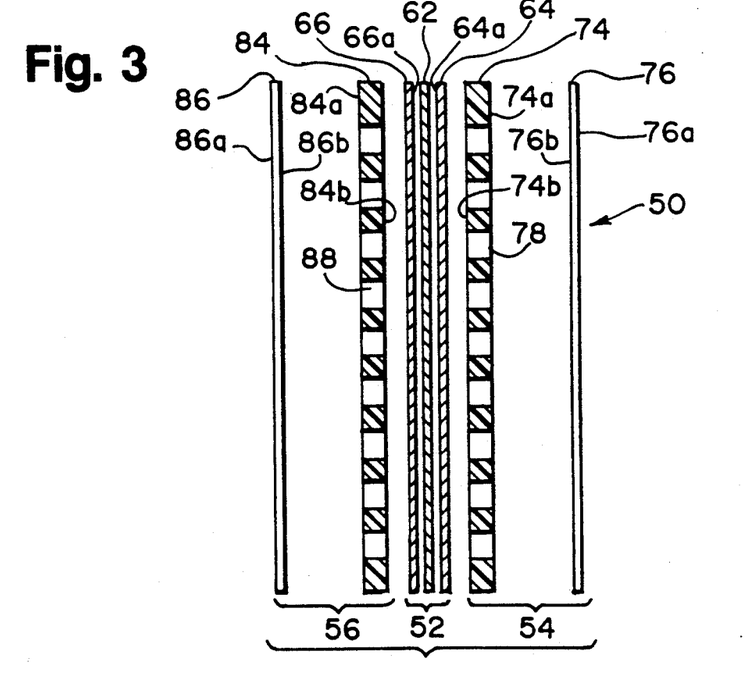
FIG. 3 is an exploded side sectional view of a fuel cell including a membrane electrode assembly interposed between two laminated fluid flow field assemblies, one layer of which is a stencil layer having openings formed therein and the other layer of which is a separator layer.

FIG. 3 illustrates a fuel cell 50 including a membrane electrode assembly 52 interposed between two laminated fluid flow field assemblies 54 and 56. As in the membrane electrode assembly 32 of FIG. 2, membrane electrode assembly 52 consists of an ion exchange membrane 62 interposed between two electrodes, namely, anode 64 and cathode 66. Anode 64 and cathode 66 are also typically formed of porous electrically conductive sheet material, preferably carbon fiber paper, and have planar major surfaces 64a and 66a, respectively. Electrodes 64 and 66 have a thin layer of catalyst material disposed on their major surfaces 64a and 66a, respectively, at the interface with membrane 62 to render them electrochemically active.

As shown in FIG. 3, anode fluid flow field plate 54 is a laminated assembly of stencil layer 74 and separator layer 76. Stencil layer 74 is formed of electrically conductive sheet material having oppositely facing planar major surfaces 74a and 74b. Stencil layer 74 has a fluid inlet formed therein (not shown in FIG. 3) and a plurality of openings formed therein in fluid communication with the fluid inlet. One such opening is designated as opening 78 in FIG. 3, and extends between major surfaces 74a and 74b. Separator layer 76 is formed of electrically conductive, substantially fluid impermeable sheet material having oppositely facing surfaces 76a and 76b. Separator layer 76 and stencil layer 74 are consolidated along their respective major surfaces 74a and 76b, using the compression normally applied to the fuel cell stack (see FIG. 1 and accompanying description herein regarding compression of the fuel cell stack) and preferably in combination with an electrically conductive adhesive. As shown in FIG. 3, separator layer 76 and stencil layer 74 cooperate to form at least one open-faced channel including opening 78 for conducting pressurized fluid introduced at the fluid inlet to major surface 64a of anode 64.

As further shown in FIG. 3, cathode fluid flow field plate 56 is a laminated assembly of stencil layer 84 and separator layer 86. Stencil layer 84 is formed of electrically conductive sheet material having oppositely facing planar major surfaces 84a and 84b. Stencil layer 84 has a fluid inlet formed therein (not shown in FIG. 3) and a plurality of openings formed therein in fluid communication with the fluid inlet. One such opening is designated as opening 88 in FIG. 3, and extends between major surfaces 84a and 84b. Separator layer 86 is formed of electrically conductive, substantially fluid impermeable sheet material having oppositely facing major surfaces 86a and 86b. Separator layer 86 and stencil layer 84 are consolidated along their respective major surfaces 84a and 86b, by compression and preferably in combination with an electrically conductive adhesive. Separator layer 86 and stencil layer 84 cooperate to form at least one open-faced channel including opening 88 for conducting pressurized fluid introduced at the fluid inlet to major surface 66a of cathode 66.

Separator layers 76, 86 are formed from electrically conductive sheet material to permit fuel cell 50 to be conveniently arranged in series with adjacent fuel cells and to conduct the electrical current generated by the stacked fuel cells. Separator layers 76, 86 are substantially fluid impermeable to form an effective seal for the fluids occupying the volume between membrane 62 and separator layers 76, 86. Stencil layers 74, 84 are also formed from electrically conductive sheet material to conduct the electrical current between the adjacent electrodes and separator plates. Stencil layers 74, 84 can be fluid permeable or fluid impermeable, depending upon the particular application of the fuel cell.

Separator layers 76, 86 and stencil layers 74, 84 are preferably formed of flexible graphite foil sheets having a thickness between about 0.003 inches (0.008 centimeters) and about 0.030 inches (0.076 centimeters). Flexible graphite foil sheets are commercially available under the trade designation "GRAFOIL" from UCAR Carbon Company, Inc. of Cleveland, Ohio, and are available in standard thicknesses (1/32 inch, 1/16 inch and ⅛ inch, for example), but other thicknesses of graphite foil sheets can be made as well. The most preferred form of GRAFOIL for the present laminated fluid flow field assemblies is UCAR's grade "GH-A" gasket laminate.

Other suitable electrically conductive materials could be used to form the separator and stencil layers of the laminated fluid flow field assemblies described and claimed herein. Such other materials include corrosion resistant metals such as niobium, somewhat corrosive resistant materials such as magnesium or copper, particularly when plated with noble metals such as gold or platinum to render them unreactive, and composite materials composed of a corrosive resistant metal powder, a base metal powder plated with the corrosive resistant metal, and/or other chemically inert electrically conductive powders, such as graphite and boron carbide, bonded together with a suitable binder to produce an electrically conductive sheet material.

The adhesive for consolidating the separator and stencil layers should preferably be carbonized and degassed to reduce contact resistance between the layers and prevent contamination.

The openings between the major surfaces of the stencil layer are preferably stamped from solid graphite foil sheets using a die. Thus, a graphite foil sheet thickness equal to the desired flow field channel depth is required. Because of the difficulty of accurately aligning and positioning multiple pieces, the stencil layer is preferably a single, unitary piece having openings formed therein.

Figure 4:
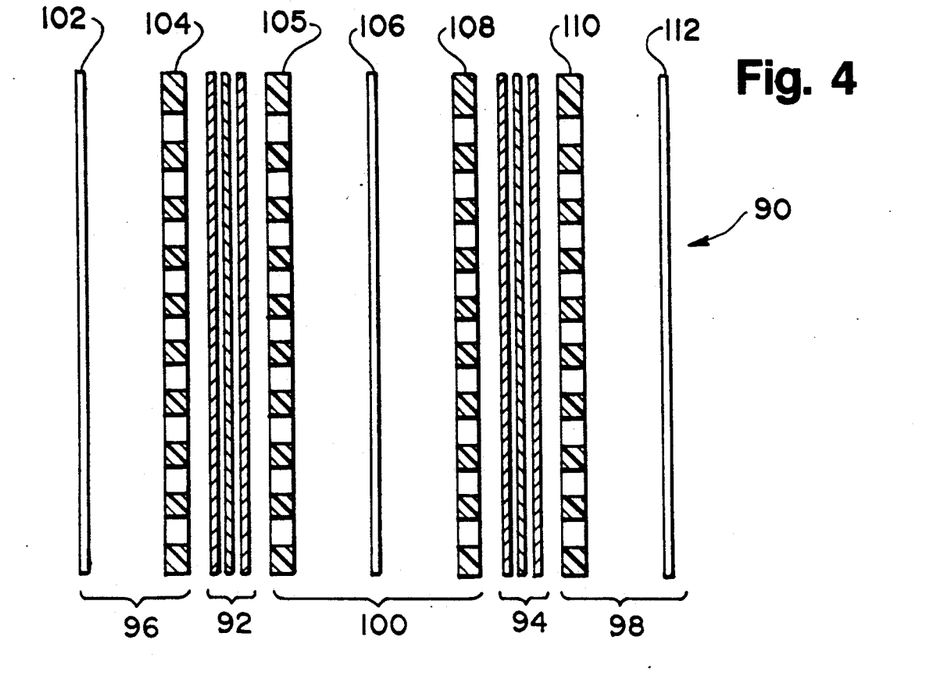
FIG. 4 is an exploded side sectional view of two adjacent fuel cells in a stack, each cell of which is similar to the fuel cell illustrated in FIG. 3, but including a common separator layer.

Turning now to FIG. 4, a fuel cell stack 90 comprises two adjacent fuel cells sharing a common separator layer 106. Stack 90 includes membrane electrode assemblies 92, 94, which are substantially identical to membrane electrode assembly 52 in FIG. 3. Stack 90 also includes separator layers 102, 106 and 112, formed of electrically conductive, substantially fluid impermeable sheet material. Stencil layers 104, 105, 108 and 110 are interposed between the respective separator layers and membrane electrode assemblies, as shown in FIG. 4. Each of stencil layers 104, 105, 108 and 110 has at least one opening formed therein which extends between the planar major surfaces of the stencil layer. In FIG. 4, separator layer 102 and stencil layer 104 are consolidated to form a laminated cathode fluid flow field assembly 96. Stencil layer 105 is consolidated with separator layer 106 at one of its major surfaces to form a laminated anode fluid flow field assembly. Stencil layer 108 is consolidated with separator layer 106 at the other of its major surfaces to form a second laminated cathode fluid flow field assembly. Thus, double-sided laminated fluid flow field assembly 100 serves as an anode fluid flow field assembly for membrane electrode assembly 92 on one side, and as a cathode fluid flow field assembly for membrane electrode assembly 94 on its other side. Finally, separator layer 112 and stencil layer 110 are consolidated to form a second laminated anode fluid flow field assembly 98.

Figure 5:
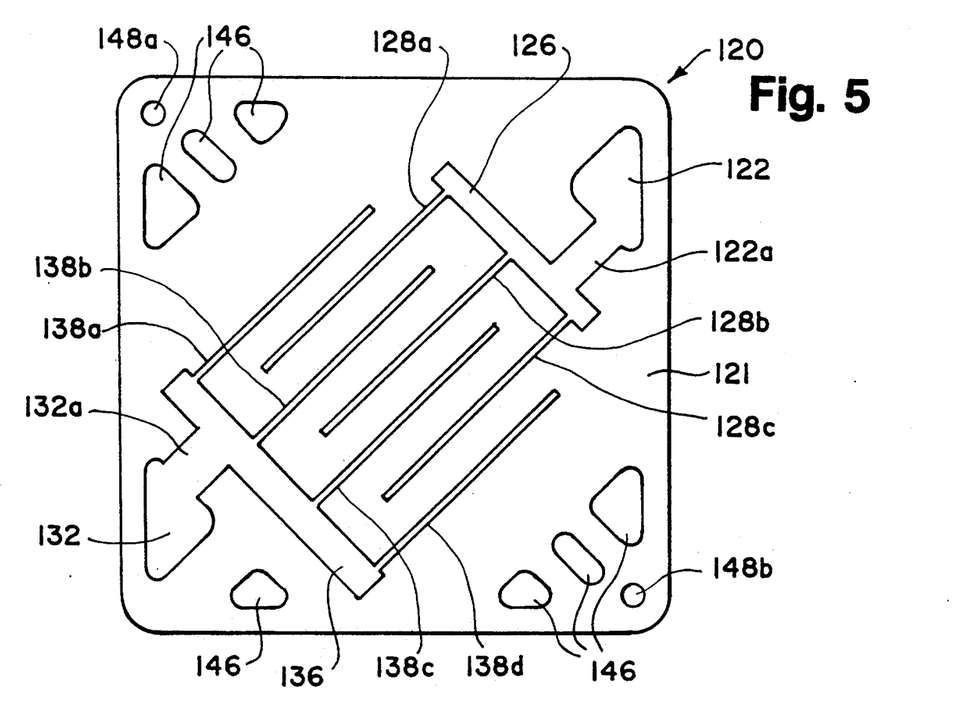
FIG. 5 is a top plan view of a stencil layer having 7 discontinuous fluid flow channel openings, 3 channel openings of which are inlet channel openings extending from an inlet header opening and 4 channel openings of which are outlet channel openings extending from an outlet header opening.

FIG. 5 illustrates a stencil layer 120 having seven (7) discontinuous fluid flow channels. Stencil layer 120 has a fluid inlet opening 122 formed in the major surface 121 of stencil layer 120. Stencil layer 120 also has three (3) inlet channel openings 128a, 128b and 128c formed in the major surface 121. Inlet channel openings 128a, 128b and 128c extend from an inlet header opening 126 formed in major surface 121 of layer 120. Inlet header opening 126 extends in turn from an extension portion 122a of inlet opening 122. Similarly, stencil layer 120 has a fluid outlet opening 132 formed in the major surface 121 of stencil layer 120. Stencil layer 120 also has four (4) outlet channel openings 138a, 138b, 138c and 138d formed in the major surface 121 of stencil layer 120. Outlet channel openings 138a, 138b, 138c and 138d extend from an outlet header opening 136 formed in major surface 121 of stencil layer 120. Outlet header opening 136 extends in turn from an extension portion 132a of outlet opening 132. Stencil layer 120 also has other openings 146 formed therein and extending between major surface 121 and the opposite major surface. Openings 146 serve as the manifolds for the various fluid reactant and coolant streams within the fuel cell.

When consolidated with a separator layer (not shown in FIG. 5) having fluid inlet openings corresponding to openings 122 and 132 (but not having the respective extension portions 122a and 132a), openings 126, 128a–c, 138a–d and 136 form an array of discontinuous, interdigitated fluid flow channels for conducting pressurized fluid introduced at fluid inlet opening 122. Fluid opening 122 is connected to a source of fuel (not shown) in the case of a laminated anode flow field assembly or a source of oxidant (not shown) in the case of the laminated cathode flow field assembly. Because the inlet and outlet channels are interdigitated, a pressurized fluid (fuel or oxidant) stream entering through opening 122 will be conducted to inlet channels 128a–c. At that point, the fluid stream will be forced through the interstices of the adjacent porous electrode material (not shown) on either side of each inlet channel 128a–c to one of the nearby outlet channels 138a–d. From there, the fluid stream will flow through outlet 132, where it is discharged from the laminated fluid flow field assembly formed by the consolidation of the separator layer (not shown) and stencil layer 120, and exhausted from the fuel cell. In FIG. 5, openings 148a and 148b formed in stencil layer 120 align with corresponding openings in the other layers of the fuel cell stack to accommodate the tie rods that consolidate the fuel cell stack in conjunction with fastening nuts (see FIG. 1 and accompanying description).

As shown in FIG. 5, each of the inlet channel openings 128a–c in stencil layer 120 is preferably disposed between a pair of outlet channel openings so that, in the consolidated assembly, the fluid stream from the inlet channels is uniformly directed from either side of the inlet channels to one of the neighboring outlet channels.

Figure 6:
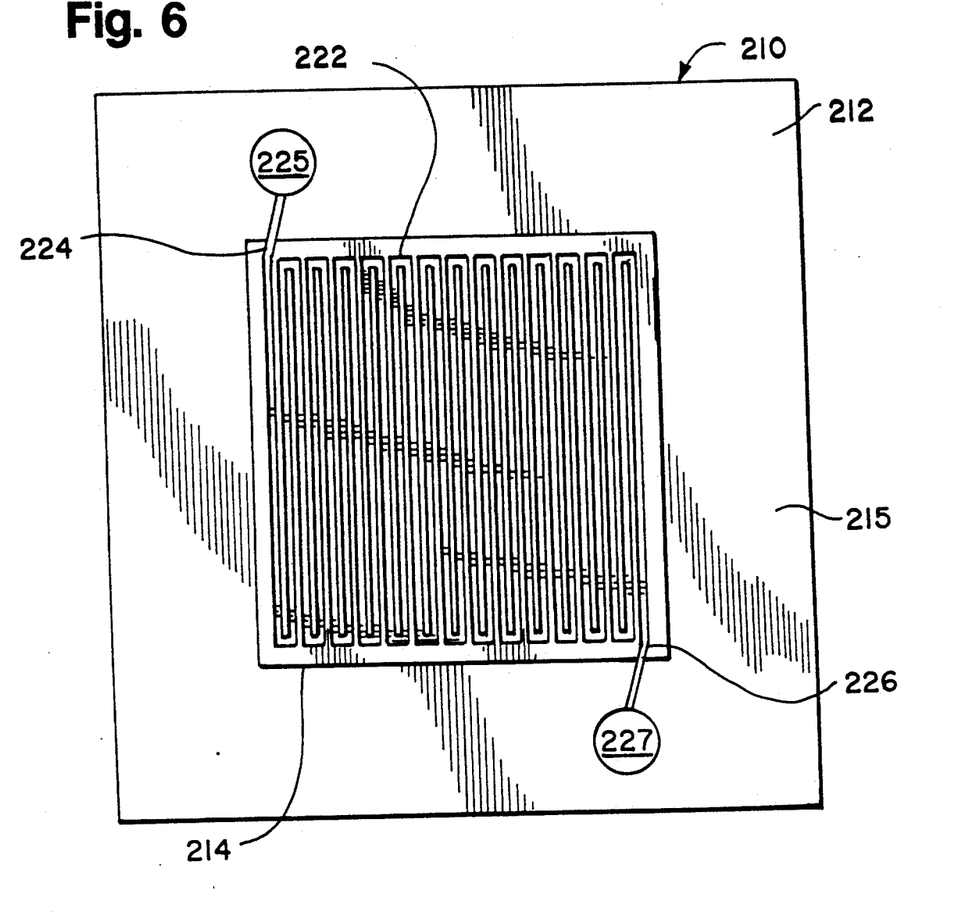
FIG. 6 is a top plan view of a conventional fluid flow field plate having a single continuous open-faced channel that traverses the central area of the plate in a plurality of passes between a fluid inlet directly connected to a fluid supply opening and a fluid outlet directly connected to a fluid exhaust opening, as described in Watkins U.S. Pat. No. 4,988,583.

A conventional (unlaminated) fluid flow field plate 210 having a single continuous reactant flow channel, described in Watkins U.S. Pat. No. 4,988,583, is shown in FIG. 6. Major plate surface 215 has formed therein, typically by numerically controlled machining, stamping or molding, a single continuous fluid flow channel 222. Channel 222 has a fluid inlet 224 at one end and a fluid outlet 226 at the other end. Fluid inlet 224 is directly connected to a fluid supply opening or manifold 225 formed in plate 212. Fluid outlet 226 is directly connected to a fluid exhaust opening or manifold 227 formed in plate 212. Fluid supply opening or manifold 225 is connected to a source of fuel (not shown) in the case of the anode flow field plate or a source of oxidant (not shown) for the cathode flow field plate. Channel 222 traverses in a plurality of passes a major central area of plate 212, which in turn generally corresponds to the electrocatalytically active region of the anode or cathode to which it is adjacent when assembled.

Figure 7:
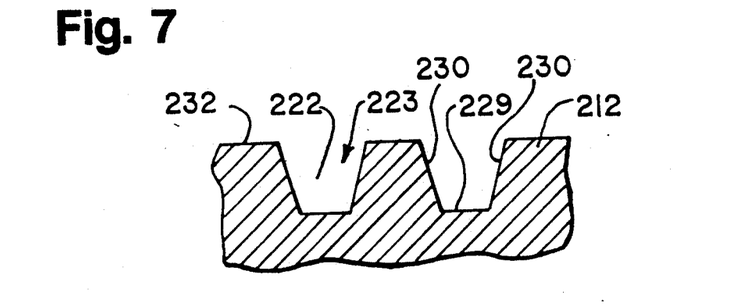
FIG. 7 is an enlarged sectional view of the channels formed in the surface of the conventional fluid flow field plate illustrated in FIG. 6.

FIG. 7 shows a cross sectional view of the channel 222 of fluid flow field plate 210 in FIG. 6. Channel 222 has a configuration that is typical of machined open face channels, namely, it is defined by a substantially flat base 229 and opposing side walls 230 which diverge outwardly toward the open face 223 of channel 222. A series of lands 232 is defined between the passes of channel 222. When assembled in the fuel cell stack, the lands 232 between channels 222 are in contact with the electrode surface adjacent thereto, so that each flow field plate also functions as a current collector.

Figure 8:
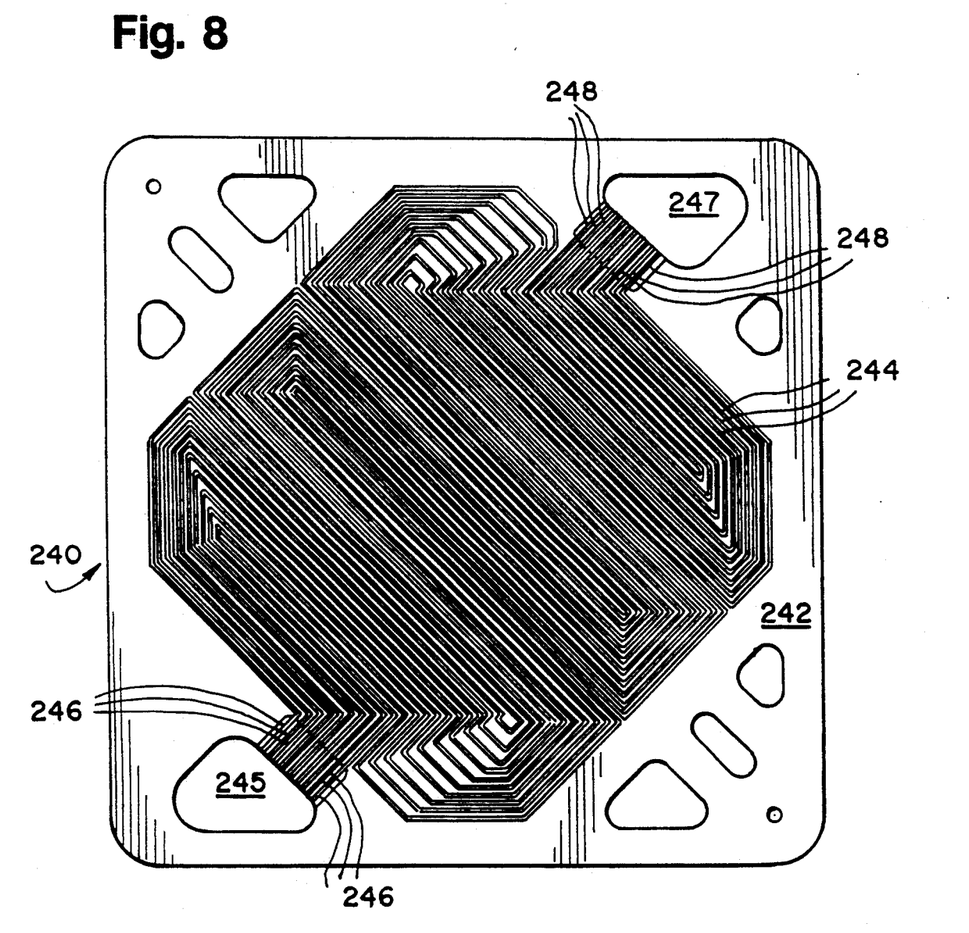
FIG. 8 is a top plan view of a conventional fluid flow field plate having multiple continuous open-faced channels, each of which traverses the central area of the plate in a plurality of passes between a fluid inlet directly connected to a fluid supply opening and a fluid outlet directly connected to a fluid exhaust opening, as described in Watkins U.S. Pat. No. 5,108,849.

A conventional (unlaminated) fluid flow field plate 240 having multiple continuous reactant flow channels, described in Watkins U.S. Pat. No. 5,108,849, is shown in FIG. 8. Major surface 242 has formed therein a plurality of flow field channels, several of which are designated by the numeral 244. Channels 244 define a generally serpentine path between fluid supply opening or manifold 245 and fluid exhaust opening or manifold 247. Each channel 244 has an inlet end 246 and an outlet end 248 directly connected to the respective fluid supply openings 245 and fluid exhaust openings 247. Plate 240, which contains ten (10) individual serpentine channels 244, has been found to operate effectively in a fuel cell adjacent the cathode, and is sometimes referred to as a 10-pass cathode flow field plate. A greater or lesser number of channels 244 could be incorporated in the plate, such as, for example, in the case of a 2-pass flow field plate which has been found to operate effectively adjacent the anode, and is sometimes referred to as a 2-pass anode flow field plate.

Figure 9:
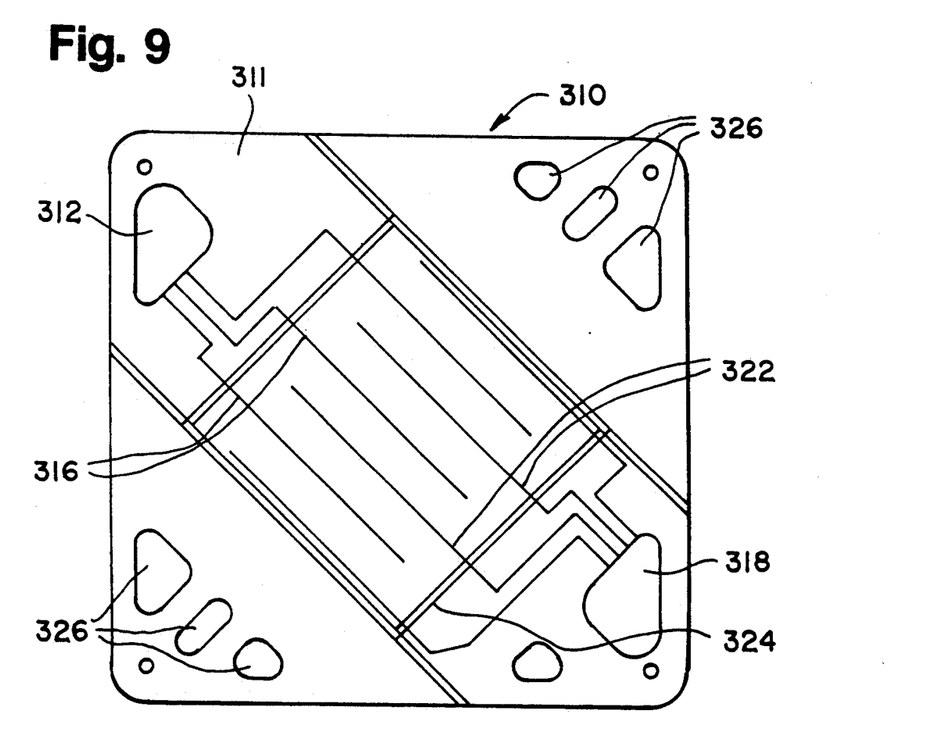
FIG. 9 is a top plan view of a conventional fluid flow field plate having 7 discontinuous fluid flow channels, 3 channels of which are inlet channels extending from a fluid inlet opening and 4 channels of which are outlet channels extending from a fluid outlet opening. The electrocatalytically active region of the electrode is located adjacent the area of the plate where the channels are parallel and do not converge toward the respective inlet and outlet openings.

FIG. 9 shows a conventional, rigid fluid flow field plate 310 having seven (7) discontinuous fluid flow channels. Plate 310 has a fluid inlet 312 formed in the surface 311 of plate 310. Inlet channels 316 extend from inlet 312 toward the central region of plate, which is adjacent the electrocatalytically active region of the electrode (not shown) with which plate 310 is associated. Plate 310 also has a fluid outlet 318 formed in the surface 311 of plate 310. Outlet channels 322 extend from outlet 318 toward the central region of the plate. As illustrated in FIG. 9, inlet channels 316 and outlet channels 322 are interdigitated, so that a pressurized fluid stream entering through opening 312 will be conducted to inlet channels 316. At that point, the fluid stream will be forced through the interstices of the adjacent porous electrode material (not shown) on either side of each inlet channel 316 to one of the nearby outlet channels 322. From there, the fluid stream will flow through outlet 318, where it is discharged from the flow field plate 310 and exhausted from the fuel cell.

As shown in FIG. 9, plate 310 contains seven (7) discontinuous fluid flow channels, three (3) channels of which are inlet channels extending from the inlet and four (4) channels of which are outlet channels extending from the outlet. Each of the inlet channels of plate 310 is preferably disposed between a pair of outlet channels so that the fluid stream from the inlet channels is uniformly directed from either side of the inlet channels to each of the neighboring outlet channels.

FIG. 9 also illustrates the location of sealant or gasketing material 324 which contacts surface 311 and circumscribes the central area of plate 310. Sealant or gasketing material 324 isolates and defines within it the electrocatalytically active region of the fuel cell adjacent the central area of plate 310. In the central area of plate 310 circumscribed by sealant or gasketing material 324, the inlet and outlet channels 316 and 322 are parallel and do not converge toward the respective inlet and outlet openings until the channels exit the electrocatalytically active region. Plate 310 also has other openings 326 formed therein, which serve as the manifolds for other reactant and coolant streams within the fuel cell.

While the discontinuous fluid flow channel configuration illustrated in FIG. 5 is preferred, it will be understood that laminated fluid flow field assemblies can also be formed with continuous, serpentine flow channels as illustrated in FIGS. 6–8, as well as the non-converging flow channel configuration illustrated in FIG. 9. Thus, while the present laminated fluid flow field assembly is particularly suited to the discontinuous flow channels described in U.S. patent application Ser. No. 07/975,791, the laminated configuration can also be employed in conjunction with continuous flow channel configurations, such as those described in Watkins U.S. Pat. Nos. 4,988,583 and 5,108,849.

The laminated fluid flow field assemblies illustrated and described herein contain fluid manifolds formed within the layers. It will be understood, however, that other means for introducing fluids to and discharging fluids from the surface of the assemblies are possible. For example, external manifolds may be preferred in some instances to introduce fluids through an inlet (or inlets) located along an edge (or edges) of the laminated assemblies and to discharge fluids from the surface of the assemblies through an outlet (or outlets) located along another edge (or edges) of the assemblies. The laminated fluid flow field assemblies described and claimed herein extend to fuel cells employing such other external manifold designs.

Figure 10:
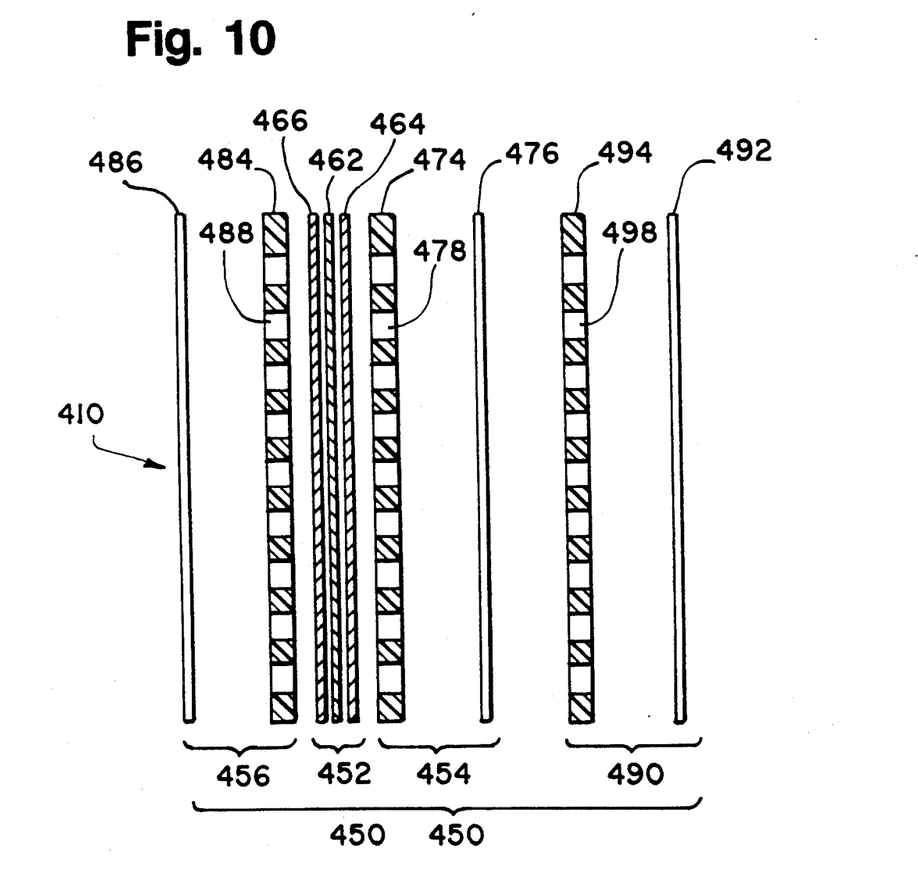
FIG. 10 is an exploded side sectional view of the fuel cell of FIG. 3, including a membrane electrode assembly interposed between two laminated fluid flow field assemblies, and further including a laminated coolant flow field assembly, one layer of which is a coolant stencil layer having an opening formed therein and the other layer of which is a coolant separator layer.

FIG. 10 illustrates a fuel cell 410 comprising an electrochemically active assembly 450 and a cooling assembly 490. Active assembly 450 is substantially identical to fuel cell 50 in FIG. 3, and includes a membrane electrode assembly 452 interposed between two laminated fluid flow field assemblies 454 and 456. Membrane electrode assembly 452 consists of an ion exchange membrane 462 interposed between two electrodes, namely, anode 464 and cathode 466. Electrodes 464 and 466 have a thin layer of catalyst material (not shown in FIG. 10) disposed on their major surfaces at the interface with membrane 462 to render them electrochemically active.

As shown in FIG. 10, anode fluid flow field plate 454 is a laminated assembly of stencil layer 474 and separator layer 476. Stencil layer 474 is formed of electrically conductive sheet material, and has a fluid inlet formed therein (not shown in FIG. 10) and a plurality of openings formed therein in fluid communication with the fluid inlet. One such opening is designated as opening 478 in FIG. 10, and extends between the major surfaces of stencil layer 474. Separator layer 476 is formed of electrically conductive, substantially fluid impermeable sheet material having oppositely facing major surfaces. Separator layer 476 and stencil layer 474 are consolidated along their respective major surfaces. Separator layer 476 and stencil layer 474 cooperate to form at least one open-faced channel including opening 478 for conducting pressurized fluid introduced at the fluid inlet to anode 464.

As further shown in FIG. 10, cathode fluid flow field plate 456 is a laminated assembly of stencil layer 484 and separator layer 486. Stencil layer 484 is formed of electrically conductive sheet material, and has a fluid inlet formed therein (not shown in FIG. 10) and a plurality of openings formed therein in fluid communication with the fluid inlet. One such opening is designated as opening 488 in FIG. 10, and extends between the major surfaces of stencil layer 484. Separator layer 486 is formed of electrically conductive, substantially fluid impermeable sheet material having oppositely facing major surfaces. Separator layer 486 and stencil layer 484 are consolidated along their respective major surfaces. Separator layer 486 and stencil layer 484 cooperate to form at least one open-faced channel including opening 488 for conducting pressurized fluid introduced at the fluid inlet of cathode 466.

As shown in FIG. 10, fuel cell 410 further includes a laminated coolant flow field assembly 490. Laminated coolant flow field assembly 490 includes a stencil layer 494 having an opening 498 formed therein and a separator layer 492. Stencil layer 494 is formed of electrically conductive sheet material, and has a coolant inlet and a coolant outlet formed therein (not shown in FIG. 10) and at least one opening formed therein in fluid communication with the coolant inlet and the coolant outlet. One such opening is designated as opening 498 in FIG. 10, and extends between the major surfaces of stencil layer 494. Separator layer 496 is formed of electrically conductive, substantially coolant fluid impermeable sheet material having oppositely facing major surfaces. Separator layer 496 and stencil layer 494 are consolidated along their respective major surfaces. Separator layer 496 and stencil layer 494 cooperate with separator layer 476 to form at least one channel including opening 498 for conducting pressurized coolant fluid between the coolant inlet and the coolant outlet.

Figure 11:
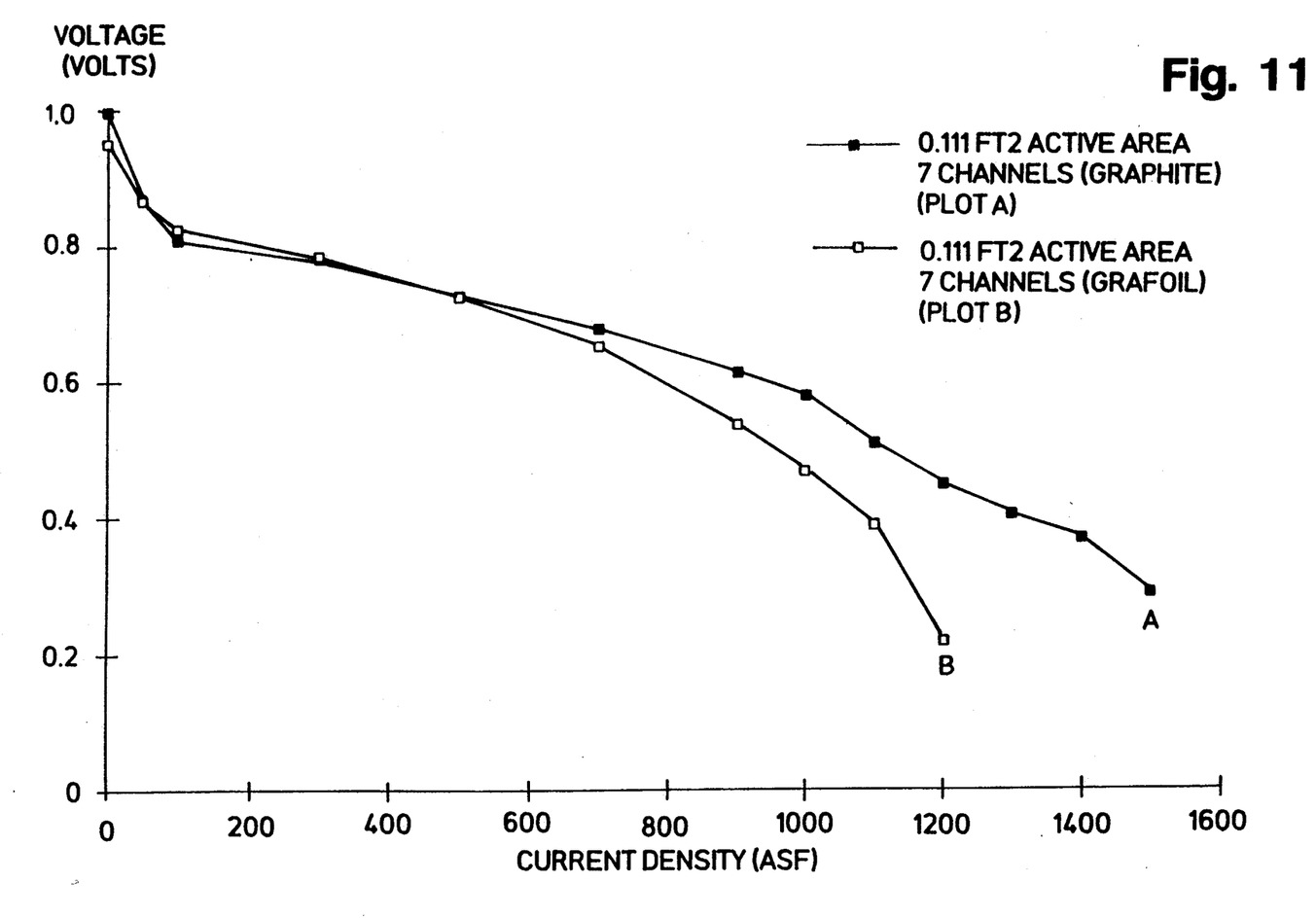
FIG. 11 is a plot of cell voltage as a function of current density for a fuel cell operated with (A) the cathode flow field plate illustrated in FIG. 8 formed of solid graphite and a 2 channel (continuous) anode flow field plate, and (B) the laminated cathode flow field assembly including the stencil layer illustrated in FIG. 5 formed of a graphite foil laminate and a 2 channel (continuous) anode flow field plate.

FIG. 11 is a plot of cell voltage as a function of current density for a fuel cell at 30/30 psig (air/H$_2$). In each of plots A and B, a 2-pass anode flow field plate was employed, along with the following operating conditions: 2.0/1.5 air/H$_2$ stoichiometry, temperature=75° C., Dow experimental cation exchange membrane. Plot A shows the performance of a fuel cell employing a conventional cathode fluid flow field plate as illustrated in FIG. 9 formed of solid graphite. Plot B shows the performance of a fuel cell employing the laminated fluid flow field assembly, as illustrated in FIG. 3, the stencil layer for which is illustrated in FIG. 5 formed of a graphite foil laminate. FIG. 11 shows that the performance of the conventional, solid graphite flow field plate was superior to the laminated fluid flow field assembly formed of graphite. However, the ease of manufacture of laminated fluid flow field assemblies as a stacked, consolidated array of graphite foil layers having the flow field pattern stamped therefrom renders the configuration of plot I economically viable even though its performance is slightly less favorable than the solid graphite counterpart in plot A.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A laminated fluid flow field assembly for an electrochemical fuel cell, said assembly comprising:
   a separator layer formed of electrically conductive, substantially fluid impermeable sheet material, said separator layer having two oppositely facing major surfaces;
   a stencil layer formed of electrically conductive sheet material, said stencil layer having two oppositely facing major surfaces, said stencil layer having a fluid inlet formed therein and having at least one opening formed therein extending between the major surfaces thereof, said at least one opening in fluid communication with said fluid inlet;
   means for consolidating said separator layer and said stencil layer along one of their respective major surfaces,
   whereby said separator layer and said stencil layer cooperate to form at least one open-faced channel for conducting pressurized fluid introduced at said fluid inlet.

2. The laminated fluid flow field assembly of claim 1 wherein said stencil layer has a fluid outlet formed therein, and wherein said at least one opening comprises at least one inlet opening extending from said fluid inlet and at least one outlet opening extending from said fluid outlet, said at least one inlet opening being discontinuous with respect to said at least one outlet opening, whereby said separator layer and said stencil layer cooperate to form at least two open-faced channels for conducting pressurized fluid introduced at said fluid inlet to said fluid outlet.

3. The laminated fluid flow field assembly of claim 2 wherein said at least one inlet opening comprises an inlet header opening extending from said fluid inlet and a plurality of inlet branch openings extending from said inlet header opening, and wherein said at least one outlet opening comprises an outlet header opening extending from said fluid outlet and a plurality of outlet branch openings extending from said outlet header opening.

4. The laminated fluid flow field assembly of claim 2 wherein said at least one outlet opening comprises a plurality of separate outlet openings, each pair of adjacent outlet channels having an inlet opening disposed therebetween along a substantial portion thereof.

5. The laminated fluid flow field assembly of claim 4 wherein said at least one outlet opening comprises at least three separate outlet openings and wherein each inlet opening disposed between each pair of adjacent outlet openings is separate with respect to the remainder of said inlet openings.

6. The laminated fluid flow field assembly of claim 1 wherein said stencil layer has a fluid outlet formed therein, and wherein said at least one opening extends continuously between said fluid inlet and said fluid outlet, whereby said separator layer and said stencil layer cooperate to form at least one open-faced channel for conducting pressurized fluid introduced at said fluid inlet to said fluid outlet.

7. The laminated fluid flow field assembly of claim 1 wherein said stencil layer is a first stencil layer, said assembly further comprising:
   a second stencil layer formed of electrically conductive sheet material, said second stencil layer having two oppositely facing major surfaces, said second stencil layer having a fluid inlet formed therein and having at least one opening formed therein extending between the major surfaces thereof, said at least one opening in fluid communication with said inlet;
   means for consolidating said separator layer and said second stencil layer along the major surface of said separator layer facing away from said first stencil layer,
   whereby said separator layer and said second stencil layer cooperate to form at least one open-faced channel for conducting pressurized fluid introduced at said fluid inlet of said second stencil layer.

8. The laminated fluid flow field assembly of claim 1 wherein said separator layer is formed from a consolidated plurality of individual layers of electrically conductive sheet material, at least one layer of which is substantially fluid impermeable.

9. The laminated fluid flow field assembly of claim 1 wherein said stencil layer is formed from a consolidated plurality of individual layers of electrically conductive sheet material.

10. The laminated fluid flow field assembly of claim 1 wherein at least one of said separator layer and said stencil layer is formed from graphite foil.

11. The laminated fluid flow field assembly of claim 10 wherein both of said separator layer and said stencil layer are formed from graphite foil.

12. An electrochemical fuel cell for converting a fluid fuel stream and a fluid oxidant stream to a reaction product stream and electrical energy, said fuel cell comprising:
   first and second laminated fluid flow field assemblies, each of said assemblies comprising:
      a separator layer formed of electrically conductive, substantially fluid impermeable sheet material, said separator layer having two oppositely facing major surfaces;
      a stencil layer formed of electrically conductive sheet material, said stencil layer having two oppositely facing major surfaces, said stencil layer having a fluid inlet formed therein and having at least one opening formed therein extending between the major surfaces thereof, said at least one opening in fluid communication with said inlet;

means for consolidating said separator layer and said stencil layer along one of their respective major surfaces;

whereby said separator layer and said stencil layer cooperate to form at least one open-faced channel for conducting pressurized fluid introduced at said inlet;

a membrane electrode assembly interposed between said first and second laminated fluid flow field assemblies, said membrane electrode assembly comprising:

an anode having a catalyst associated therewith to render a region of said anode electrocatalytically active wherein cations are produced from said fluid fuel stream;

a cathode having a catalyst associated therewith to render a region of said cathode electrocatalytically active wherein an electrochemical reaction between said cations and said fluid oxidant stream is promoted;

a solid polymer ion exchange membrane disposed between said anode assembly and said cathode assembly, said membrane facilitating the migration of cations from said anode assembly to said cathode assembly and isolating said fluid fuel stream from said fluid oxidant stream;

an electrical path for conducting electrons formed at said anode assembly to said cathode assembly.

13. The electrochemical fuel cell of claim 12 wherein each of said stencil layers is a first stencil layer, at least one of said first and second laminated fluid flow field assemblies further comprising:

a second stencil layer formed of electrically conductive sheet material, said second stencil layer having two oppositely facing major surfaces, said second stencil layer having a fluid inlet formed therein and having at least one opening formed therein extending between the major surfaces thereof, said at least one opening in fluid communication with said inlet;

means for consolidating said separator layer and said second stencil layer along the major surface of said separator layer facing away from said first stencil layer;

whereby said separator layer and said second stencil layer cooperate to form at least one open-faced channel for conducting pressurized fluid introduced at said fluid inlet of said second stencil layer to the electrode of an adjacent membrane electrode assembly.

14. The electrochemical fuel cell of claim 12, further comprising a cooling assembly adjacent one of said separator layers on the side facing away from said membrane, said cooling assembly comprising:

a coolant separator layer formed of electrically conductive, substantially fluid impermeable sheet material, said separator layer having two oppositely facing major surfaces;

a coolant stencil layer interposed between said adjacent separator and said coolant separator layer, said coolant stencil layer formed of electrically conductive sheet material having two oppositely facing major surfaces, said coolant stencil layer having a coolant inlet and a coolant outlet formed therein and having at least one opening formed therein extending between the major surfaces thereof, said at least one opening in fluid communication with said coolant inlet and said coolant outlet;

means for consolidating said coolant separator layer and said coolant stencil layer along one of their respective major surfaces;

whereby said coolant separator layer and said coolant stencil layer cooperate to form at least one open-faced channel for conducting pressurized coolant fluid between said coolant inlet and said coolant outlet.

15. The electrochemical fuel cell of claim 14 wherein the major surface of said coolant separator layer facing away from said coolant stencil layer cooperates with another stencil layer to form a laminated fluid flow field assembly of an adjacent fuel cell.

16. A method of fabricating a laminated fluid flow field assembly for an electrochemical fuel cell, the method comprising the steps of:

providing a separator layer formed of electrically conductive, substantially fluid impermeable sheet material, said separator layer having two oppositely facing major surfaces;

providing a stencil layer formed of electrically conductive sheet material, said stencil layer having two oppositely facing major surfaces, forming a fluid inlet in said stencil layer;

forming at least one opening extending between the major surfaces of said stencil layer, said at least one opening in fluid communication with said inlet;

consolidating said separator layer and said stencil layer along one of their respective major surfaces.

17. The fabrication method of claim 16 wherein said stencil layer is a first stencil layer, said fabrication method further comprising the steps of:

providing a second stencil layer formed of electrically conductive sheet material, said second stencil layer having two oppositely facing major surfaces;

forming a fluid inlet in said second stencil layer;

forming at least one opening extending between the major surfaces of said second stencil layer, said at least one opening in fluid communication with said inlet;

consolidating said separator layer and said second stencil layer along the surface of said separator layer facing away from said first stencil layer.

* * * * *